United States Patent
Ahn et al.

(10) Patent No.: US 11,607,618 B1
(45) Date of Patent: Mar. 21, 2023

(54) SYSTEMS AND METHODS FOR SUPPORTING DIFFERENT PLAYER TYPES IN A FRANCHISE GAME BASED ON OWNERSHIP OF UNIQUE DIGITAL ARTICLES

(71) Applicant: Mythical, Inc., Sherman Oaks, CA (US)

(72) Inventors: Chong Won Ahn, Rancho Palos Verdes, CA (US); Rudy Koch, Sammamish, WA (US)

(73) Assignee: Mythical, inc., Sherman Oaks, CA (US)

( * ) Notice: Subject to any disclaimer, the term of this patent is extended or adjusted under 35 U.S.C. 154(b) by 0 days.

(21) Appl. No.: 17/890,109

(22) Filed: Aug. 17, 2022

(51) Int. Cl.
- *A63F 13/828* (2014.01)
- *H04L 9/00* (2022.01)
- *A63F 13/69* (2014.01)
- *A63F 13/65* (2014.01)

(52) U.S. Cl.
CPC ............ *A63F 13/828* (2014.09); *A63F 13/65* (2014.09); *A63F 13/69* (2014.09); *H04L 9/50* (2022.05)

(58) Field of Classification Search
CPC ........ A63F 13/828; A63F 13/65; A63F 13/69; H04L 9/50
See application file for complete search history.

(56) References Cited

U.S. PATENT DOCUMENTS

| | | | |
|---|---|---|---|
| 8,417,715 B1 | 4/2013 | Bruckhaus | |
| 8,469,801 B2 | 6/2013 | Ocko | |
| 10,286,324 B1 | 5/2019 | Mclellan | |
| 11,170,352 B2 | 11/2021 | Oochi | |
| 2009/0117996 A1 | 5/2009 | Death | |
| 2010/0121729 A1 | 5/2010 | Betzler | |
| 2011/0055733 A1 | 3/2011 | Hamilton, II | |
| 2011/0295649 A1 | 12/2011 | Fine | |
| 2014/0128153 A1 | 5/2014 | Driemeyer | |
| 2014/0206452 A1* | 7/2014 | Bambino | A63F 13/335 463/40 |
| 2014/0335963 A1 | 11/2014 | Wolters | |
| 2015/0163311 A1* | 6/2015 | Heath | G06Q 50/01 709/204 |
| 2016/0203509 A1 | 7/2016 | Sharp, III | |
| 2018/0247191 A1 | 8/2018 | Katz | |

(Continued)

*Primary Examiner* — William H McCulloch, Jr.
*Assistant Examiner* — Ankit B Doshi
(74) *Attorney, Agent, or Firm* — Esplin & Associates, PC

(57) ABSTRACT

Systems and methods to support different player types in a franchise game based on ownership of unique digital articles are disclosed. Exemplary implementations may execute an instance of a franchise game, the different player types including a first player type and a second player type providing access to different utilities; receive and perform in-game action instructions from players having different player types, wherein different in-game action instructions fall within different sets of utilities; receive exchange instructions from a particular player having the first player type to obtain a particular affiliation-specific unique digital article; modify the player account for the particular player such that the particular player no longer has the first player type but rather the second player type; receive and perform a particular in-game action instruction from the particular player by virtue of the particular player having the second player type; and/or other steps.

20 Claims, 5 Drawing Sheets

(56) References Cited

U.S. PATENT DOCUMENTS

| | | |
|---|---|---|
| 2018/0341861 A1 | 11/2018 | Katz |
| 2018/0361253 A1 | 12/2018 | Grosso |
| 2018/0373983 A1 | 12/2018 | Katz |
| 2019/0180329 A1* | 6/2019 | Chetlur ................ G06Q 50/01 |
| 2019/0303960 A1 | 10/2019 | Walsh |
| 2020/0122021 A1 | 4/2020 | Gordon |
| 2020/0126112 A1 | 4/2020 | Leonard |
| 2020/0202668 A1 | 6/2020 | Cotta |
| 2020/0258061 A1 | 8/2020 | Beadles |
| 2020/0320644 A1* | 10/2020 | Hollis ................ G06Q 30/0222 |
| 2020/0327449 A1 | 10/2020 | Tiwari |
| 2020/0357246 A1* | 11/2020 | Nelson ................ G07F 17/323 |
| 2021/0019987 A1* | 1/2021 | Cohen ................ G07F 17/3244 |
| 2021/0042590 A1 | 2/2021 | Watts |
| 2021/0065505 A1 | 3/2021 | Rousseau |
| 2021/0118085 A1 | 4/2021 | Bushnell |
| 2022/0152491 A1 | 5/2022 | Hall |
| 2022/0198562 A1 | 6/2022 | Cella |

* cited by examiner

SYSTEMS AND METHODS FOR SUPPORTING DIFFERENT PLAYER TYPES IN A FRANCHISE GAME BASED ON OWNERSHIP OF UNIQUE DIGITAL ARTICLES

FIELD OF THE DISCLOSURE

The present disclosure relates to systems and methods to support different player types in a franchise game based on ownership of unique digital articles, and, in particular, providing access to different utilities within the franchise game based on the players having different player types.

BACKGROUND

Online gaming platforms are known. Having different types of players interacting in the same game is known. Supporting or providing different utilities to different types of players is known.

SUMMARY

One aspect of the present disclosure relates to a system configured to support different player types in a franchise game based on ownership of unique digital articles are disclosed. The system may include electronic storage, an online gaming platform, one or more registry servers, and/or other components. The system may execute an instance of a franchise game, the different player types including a first player type and a second player type providing access to different utilities. The system may receive and perform in-game action instructions from players having different player types, wherein different in-game action instructions fall within different sets of utilities; receive exchange instructions from a particular player having the first player type to obtain a particular affiliation-specific unique digital article. The system may modify the player account for the particular player such that the particular player no longer has the first player type but rather the second player type. The system may receive and perform a particular in-game action instruction from the particular player by virtue of the particular player having the second player type; and/or may perform other steps.

Another aspect of the present disclosure related to a method of supporting different player types in a franchise game based on ownership of unique digital articles are disclosed. The method may include executing an instance of a franchise game, the different player types including a first player type and a second player type providing access to different utilities. The method may include receiving and performing in-game action instructions from players having different player types, wherein different in-game action instructions fall within different sets of utilities. The method may include receiving exchange instructions from a particular player having the first player type to obtain a particular affiliation-specific unique digital article. The method may include modifying the player account for the particular player such that the particular player no longer has the first player type but rather the second player type. The method may include receiving and performing a particular in-game action instruction from the particular player by virtue of the particular player having the second player type. The method may include other steps.

As used herein, any association (or relation, or reflection, or indication, or correspondency, or correlation) involving servers, processors, client computing platforms, players, player accounts, player types, currencies, inventories, articles, digital articles, characters, rosters, instructions, requests, exchanges, upgrades, offers, transactions, in-game actions, virtual items, distributions, ownership, rights, permanent registries, determinations, verifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
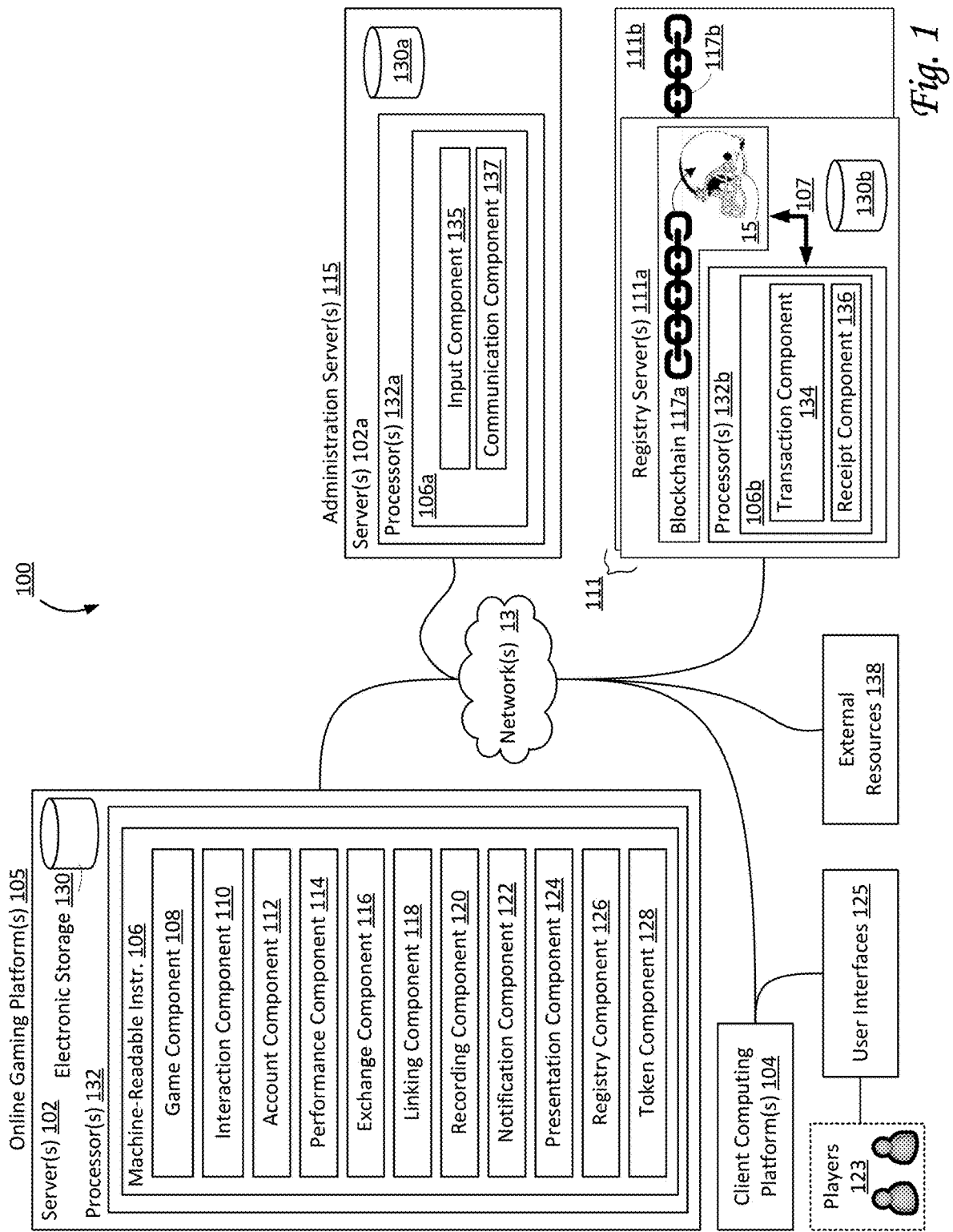
FIG. 1 illustrates a system configured to support different player types in a franchise game based on ownership of unique digital articles, in accordance with one or more implementations.

FIG. 1 illustrates a system 100 configured to support different player types in a franchise game based on ownership of unique digital articles, in accordance with one or more implementations. In some implementations, the franchise game may include a set of affiliations (these may also be referred to as "teams"). For example, the affiliations may include a first affiliation, a second affiliation, and so forth. In some implementations, individual affiliations may correspond to individual professional sports-teams in the real world. Individual affiliations or teams may operate in a manner similar to franchises for professional sports, forming a league. The different player types may include a first player type, a second player type, and so forth. In some implementations, the first player type may facilitate gameplay in the franchise game in a particular role, e.g., a role corresponding to general manager of a team or roster, and/or a role corresponding to coach of a team or roster. In some implementations, the second player type may facilitate gameplay within the franchise game in a different role compared to the first player type, such as, e.g., a role corresponding to a board member of a team or franchise.

For example, the first player type may provide access to a first set of utilities and/or benefits within online gaming platform 105 and/or the franchise game, the second player type may provide access to a second set of utilities and/or benefits within online gaming platform 105 and/or the franchise game, and so forth. In some implementations, the second set of utilities may include one or more particular utilities that are not included in the first set of utilities. In some implementations, the second set of benefits may include one or more particular benefits that are not included in the first set of benefits. In other words, the different player types may provide access to different (types of) utilities and/or benefits within online gaming platform 105 and/or the franchise game. In some implementations, whether a player has a particular player type (e.g., the second player type) may be based on whether that player owns an affiliation-specific unique digital article (or, in other words, a type of unique digital article that is specific to a particular affiliation as used in the franchise game).

As used herein, the term "utility" may represent goods, services, content, access, and/or other types of uses that players can experience within online gaming platform 105 and/or the franchise game, e.g., in exchange for consideration. Alternatively, and/or simultaneously, a utility may be one or more of (i) a virtual item that can be used in the franchise game, (ii) access to a restricted area within the franchise game, (iii) participation in a particular multi-player game mode within the franchise game, (iv) modification of a roster of unique digital articles that are correlated with correlated in-game characters, (v) access to a particular media channel that is related to the franchise game, and/or other types of uses that players can experience within online gaming platform 105 and/or the franchise game. The players may include a first player, a second player, a third player, and so forth. As used herein, the term "benefit" may represent anything of value or use in system 100, or online gaming platform 105, or registry servers 111, or anything that can be exchanged or otherwise traded for something of such value or use, whether tangible or not, whether physical or virtual. The term "in-game benefit" refers to any benefit of value or use within the franchise game. By way of non-limiting example, an amount of in-game currency, in-game virtual items, and access to otherwise restricted content are examples of in-game benefits.

As used herein, the term "virtual territory" may represent any specific location or area in online gaming platform 105 and/or in a game that is executed within online gaming platform 105, whether fixed in place (e.g., a mountain top, a sports arena) or not (e.g., a moving train), or a mix of both (e.g., a trading hub in an orbiting space station). In some implementations, individual virtual territories may produce (in-game) benefits, either directly (e.g., a farm, a mine, a factory, a concession stand, etc.) or indirectly (e.g., a toll road, a trading hub whether individual transactions are taxed, an amusement park, a stadium). In some implementations, indirectly produced benefits may be provided not at the expense of some players, but rather as part of the design of the (economic) mechanics of a game (e.g., collect $200 when passing "GO" in Monopoly™). These virtual territories may be referred to as benefit-producing virtual territories.

As a preliminary and non-limiting example, by virtue of the systems and methods described in this disclosure, online gaming platforms may support different types of players who can interact with each other in the same (franchise) game(s) and on the same online gaming platforms. Additionally, the systems and methods described herein may support using multiple types of different digital articles (e.g., virtual currencies, fungible digital articles, non-fungible digital articles, etc.) having different utilities for different types of players. In particular, individual players of a first player type (e.g., "free-to-play") can change or upgrade to a second player type (e.g., "premium" or "subscription-based"), and in doing so additional utilities may become available to these individual players. Changing or upgrading player type may occur automatically in response to obtaining (and recording) ownership of a particular type of unique digital article, particularly affiliation-specific unique digital articles. For example, a particular player may upgrade from a "general manager"-player-type to a "board member"-player-type by obtaining an affiliation-specific unique digital article. For example, assume a first affiliation or team is referred to as the "A-town A's", a second affiliation or team is referred to as the "B-town Bees", a third affiliation or team is referred to as the "C-town Seas", and so forth. A first player who does not own any of the A-town A's limited supply of ("A-town A's"-specific) unique digital articles would have the default or first player type, which may be the "general manager"-player-type. In some implementations, regardless of player type, the first player may be associated with the first affiliation of the A-town A's. A second player who does not own any of the B-town Bees' limited supply of ("B-town Bees"-specific) unique digital articles would have the default or first player type, which may be the "general manager"-player-type. In some implementations, regardless of player type, the second player may be associated with the second affiliation of the B-town Bees. In some implementations, individual players voluntarily select an affiliation to be associated with. In some implementations, an individual player may only be associated with a single affiliation.

In some implementations, individual players may control and/or otherwise manage rosters of characters (including but not limited to user-controllable playable in-game characters). For example, a roster may include a set of (character-specific) unique digital articles that are correlated with in-game characters (also referred to as the correlated in-game characters). For example, in-game characters may be (or represent) athletes. For example, individual in-game characters may be modeled on and/or otherwise correspond to real-world professional athletes. In some implementations, an individual player may modify their roster by obtaining and/or trading (character-specific) unique digital articles. For example, a player could purchase additional character-specific unique digital articles such that the player's roster includes the additional correlated in-game characters for gameplay within the franchise game. Character-specific unique digital articles are a different type of unique digital article than affiliation-specific unique digital articles. In some implementations, a specific real-world athlete may be associated with a limited set of character-specific unique digital articles of varying quality levels. For example, each of these character-specific unique digital articles may represent the same athlete "John Johnson", but the effect of using a particular character-specific unique digital articles (of "John Johnson") in the franchise game may be different for a legendary-level "John Johnson" unique digital article compared to a common-level "John Johnson" unique digital article. The limited set of legendary-level "John Johnson" unique digital articles may be smaller than the limited set of common-level "John Johnson" unique digital articles.

The different types of digital articles may include one or more fungible digital articles (e.g., a first currency, or a "token currency", etc.), one or more unique digital articles, one or more in-game currencies (e.g., coins, gold, gems, virtual bucks, etc.), and/or other types of digital articles. In some implementations, a particular currency such as the token currency may be a fungible digital article that is tradeable on a permanent registry, e.g., a blockchain (e.g., a blockchain 117a implemented by one or more registry servers 111). In some implementations, a different currency such as a subscription currency may (only) be available for purchase using token currency, at least within online gaming platform 105. In other words, the subscription currency may not be available for purchase using (any of the) in-game currencies (i.e., other than the token currency). Accordingly, the price of the subscription currency may be (capable of being) decoupled from certain other currencies, including fiat currency. Character-specific unique digital articles may be tradeable on a permanent registry. Affiliation-specific unique digital articles may be tradeable on a permanent registry.

As used herein, a digital article is fungible if it is functionally and/or physically indistinguishable from another digital article. For example, a payment token such as a Bitcoin is fungible. A digital article may be non-fungible if it is unique, e.g., one-of-a-kind. For example, a specific individual CryptoKitty™ may be non-fungible. A digital article may be semi-fungible if there is a set of a limited number of similar but distinguishable digital articles. For example, a limited-edition Blank™ or another in-game character may be semi-fungible. For example, one of a limited number of 2-dimensional or 3-dimensional in-game virtual items may be semi-fungible. For example, a digital ticket to a show, concert, exhibition, and/or other event may be semi-fungible. For example, a piece of art or jewelry (e.g., as a virtual item or as representing a physical item) may be semi-fungible. As used herein, semi-fungible digital articles are considered as unique, "not fungible", or non-fungible digital articles. In some implementations, digital articles may be usable within one or more games. In some implementations, virtual territories may be considered non-fungible digital articles. Affiliation-specific digital characters are considered unique or non-fungible. In some implementations, each affiliation may have a limited supply of its affiliation-specific unique digital articles. For example, the "A-town A's"-specific unique digital articles may be limited to 1000 articles, 2000 articles, 2500 articles, 3000 articles, 4000 articles, 5000 articles, 7500 articles, 10000 articles, 25000 articles, and/or another predetermined limited number of articles.

As used herein, the term "unique digital article" may refer to digital articles that are uniquely identified and/or uniquely identifiable, e.g., by an identifier or by identifying information. For example, in some implementations, an identifier or identifying information may include or be based on a combination of different types of information, including but not limited to information regarding the type of a digital article, a serial number and/or other (alpha)numerical identifier of the digital article, and/or other types of information. As used herein, rights pertaining to unique digital articles may be tracked, recorded, and/or otherwise registered on one or more permanent registries. As such, a unique digital article may be a registry-tracked unique digital article. Ownership of a unique digital article may be recorded and/or otherwise registered on one or more permanent registries.

Individual unique digital articles may be associated and/or correlated with another entity (which may be referred to as a "correlated entity" or, in case of the franchise game, a "correlated in-game character") by virtue of technology provided and/or supported by the one or more permanent registries on which the rights pertaining to the individual unique digital articles is tracked (including but not limited to smart contracts and/or other executable code on the one or more permanent registries). Accordingly, rights pertaining to a unique digital article may correlate to the provision of one or more rights (e.g., usage rights) with respect to the correlated entity or the correlated in-game character. Transactions involving a unique digital article recorded on a permanent registry may correlate to certain transactions (or modifications) of the correlated entity, and/or vice versa. For example, exchanging and/or trading a particular in-game character within a game (from one player to another player) may correspond to a transaction recorded on the permanent registry (of a unique digital article that is correlated to the particular in-game character).

In some implementations, correlated entities may be (or include) virtual items configured to be used within online-gaming platform 105 (such as, for example, a player-controllable in-game virtual character that is usable within an instance of a game within online gaming platform 105). Other types and/or combinations of correlated entities are envisioned within the scope of this disclosure, including but not limited to physical and/or virtual objects, items, rights, memberships, grants, etc. The use of the singular "entity" or "correlated entity" is not intended to be limiting, as multiple different objects, items, rights, memberships, grants, characters, etc. may be correlated to a single unique digital article. By way of non-limiting example, a correlated entity may be an art work, a ticket to an event, a subscription to certain media content, a bundle of rights related to captured audio and/or video information, ownership of or accessibility to distribution gains, and so forth. As used herein, the term "non-fungible token" or "NFT" may be used to refer to a combination of a particular unique digital article and a particular correlated entity or character that is correlated to the particular unique digital article.

Referring to FIG. 1, system 100 may include one or more online gaming platforms 105, registry server(s) 111, administration server(s) 115, client computing platform(s) 104, user interface(s) 125, server(s) 102, external resource(s) 138, and/or other components. Players 123 (also referred to as users) may include one or more of a first player, a second player, a third player, a fourth player, an administrative user, and/or other players. Players 123 may include players who play and/or otherwise interact on online gaming platform 105. As used in descriptions herein, any use of the term "player" may refer to player(s) 123. Electronic storage 130a and electronic storage 130b may be similar to electronic storage 130 as described elsewhere in this disclosure, though included in administration servers 115, and registry servers 111, respectively, as depicted in FIG. 1.

Instances of games may be executed within one or more online gaming platforms 105. As used herein, online gaming platform 105 may refer to either an individual game (e.g., an interactive online franchise game), a type of gaming console and its ecosystem, and/or both. Online gaming platform 105 may be configured to host (and/or execute instances of) one or more franchise games. Online gaming platform 105 may be operated, hosted, and/or owned by one or more stakeholders of online gaming platform 105. For example, a platform operator (and/or another stakeholder, such as an owner) may sell in-game digital items (e.g., characters, weapons, resources, etc.) to players 123 of online gaming platform 105.

Referring to the franchise game and to online gaming platform 105, in some implementations, individual players may own and/or control individual unique digital articles, correlated entities, and/or other virtual items, and exchange these with (or to) other individual players. As used herein, exchanges refer to individual players winning, losing, auctioning, selling, purchasing, trading, bartering, wagering, staking, and/or otherwise exchanging virtual items (e.g., directly, without a store or store interface under control of online gaming platform 105) to other individual players or with other individual players (including exchanging virtual items through player-to-player challenges). Due to an exchange, ownership of a digital article may transition from an original owner to a new owner (even if there may, in some implementations, be one or more intermediary and/or temporary owners during the process of performing the exchange). In some implementations, unique digital articles may be associated and/or correlated with other rights than ownership rights, such as, by way of non-limiting example, access to distributions (also referred to as "distribution rights").

In some implementations, distribution rights of (unique) digital articles may reflect rights held by one or more of the players 123 to receive certain distributions (e.g., of in-game benefits) upon the occurrence of certain events. For example, such events may include exchanges involving the particular digital articles. In some implementations, the distributions may occur subsequent or responsive to a particular event or action (such as, e.g., a sale of a particular digital article), e.g., within online gaming platform 105. As used herein, in-game benefits may include one or more of a portion of the proceeds of the particular event or action, a fee related to the particular event or action, a minimum payment triggered by the occurrence of the particular event or action (or a set of particular events or actions), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries may receive something of value and/or use. The distribution may include one or more virtual currencies such as virtual tokens, virtual stars, virtual points, real-world currencies (e.g., US Dollars), and/or other benefits. In some implementations, ownership of affiliation-specific unique digital articles may correspond to distribution rights pertaining to that affiliation.

In some implementations, (unique) digital articles, correlated entities, and/or other virtual items may include and/or be virtual items and may be usable within online gaming platform 105. In some implementations, these may represent (three-dimensional) in-game player-controllable characters that can interact with other (in-game) virtual items within online gaming platform 105. In some implementations, virtual items may include one or more of territories, weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a player may use, own, sell, trade, destroy, and/or otherwise effectuate a change of ownership or control.

Registry server(s) 111 (e.g., registry server 111a, registry server 111b, and so forth) may be used to implement one or more permanent registries, including but not limited to blockchain 117a, blockchain 117b (partially visible in FIG. 1), and so forth. In some implementations, one or more permanent registries may be decentralized and/or immutable registries (e.g., an append-only blockchain). In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more registry servers 111). The distributed computing platform may support a virtual machine (not shown in FIG. 1). The distributed computing platform and/or the virtual machine may form a runtime environment for smart contracts (sometimes referred to as programs), and/or other executable code. A distributed computing platform may include electronic storage configured to store part or all of blockchain 117a. For example, the smart contracts may be stored on blockchain 117a, blockchain 117b, and/or another permanent registry. In some implementations, the distributed computing platform may be the EOSIO platform. In some implementations, the distributed computing platform may be similar to or based on the EOSIO platform. In some implementations, the distributed computing platform may be ETHEREUM. In some implementations, the distributed computing platform may be similar to or based on ETHEREUM. In some implementations, the distributed computing platform may be the POLYGON platform. In some implementations, the distributed computing platform may be similar to or based on the POLYGON platform. In some implementations, the distributed computing platform may be the SOLANA platform. In some implementations, the distributed computing platform may be similar to or based on the SOLANA platform. In some implementations, the virtual machine may be a distributed and/or decentralized virtual machine.

In some implementations, at least one of the permanent registries implemented by registry servers 111 is a private permissioned permanent registry (e.g., a private permissioned blockchain). The private permissioned permanent registry may be configured to record information, including but not limited to fungible digital articles and non-fungible digital articles. The recorded information may include information pertaining to unique digital articles that are associated and/or correlated with in-game player-controllable characters that are configured to be used in an instance of a franchise game. The recorded information may include rights pertaining to the unique digital articles. Implementing the in-game actions in the instance of the franchise game may include, for at least some of the in-game actions implemented in the instance of the franchise game, effectuating modifications to the recorded information pertaining to the unique digital article. For example, ownership and/or usage rights may be modified. In some implementations, a unique digital article may be removed from one permanent registry and added or recorded on another permanent registry. In some implementations, at least one of the permanent registries implemented by registry servers 111 is a public permanent registry (e.g., a public blockchain). The public permanent registry may be configured to be part of either EOSIO mainnet, SOLANA mainnet, ETHEREUM mainnet, ETHEREUM 1.5, ETHEREUM 2.0, a derivative of ETHEREUM 2.0 that is configured to perform transactions of Ether (ETH) between accounts, or a derivative of EOSIO that is configured to perform transactions of EOS between different accounts.

Elements of blockchain 117a or another permanent registry may be grouped together in units that are referred to as blocks. For example, an individual block may include one or more digital articles (or digital assets) and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital articles, one or more transactions, smart contracts, executable code, and/or other information.

In some implementations, one or more permanent registries implemented by registry servers 111 may be publicly accessible. In some implementations, one or more permanent registries implemented by registry servers 111 may be private and/or permissioned. In some implementations, one or more permanent registries implemented by registry servers 111 may be append-only. In some implementations, existing blocks of one or more permanent registries implemented by registry servers 111 can substantially not be altered or deleted, unless multiple copies are altered. This is unlikely to happen provided that the multiple copies are stored on different computing platforms, e.g., in different geographical locations. Permanent registries may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-2 (e.g., SHA-256), BLAKE2, SHA-3 (e.g., SHAKE256), and/or another hashing function. Contents of individual blocks, transactions, and/or articles may be digitally signed in a manner that proves integrity and/or prevents tampering, e.g., by providing authentication, as well as non-repudiation.

As depicted in FIG. 1, registry server 111a may include one or more of electronic storage 130b, processor(s) 132b, machine-readable instructions 106b, (node of) blockchain 117a, and/or other components. Machine-readable instructions 106b may include one or more instruction components. The instruction components may include computer program components. The instruction components may include one or more of a transaction component 134, a receipt component 136, and/or other instruction components. In some implementations, an individual registry server may be dedicated to a particular node of a permanent registry. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 117a may include a unique digital article 15 (by way of non-limiting example, unique digital article 15 may correspond to access to distributions of benefits produced by a particular virtual territory, and ownership of unique digital article 15 may have been recorded on blockchain 117a, e.g., as being obtained by a set of players in exchange for an amount of fungible digital articles). Registry server 111b may include similar components as registry server 111a, including but not limited to blockchain 117b and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Players may access system 100 via client computing platform(s) 104. In some implementations, system 100 and/or registry server(s) 111 may be configured to communicate with one or more of online gaming platform(s) 105, players 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. The instruction components may include computer program components. The instruction components may include one or more of a game component 108, an interaction component 110, an account component 112, a performance component 114, an exchange component 116, a linking component 118, a recording component 120, a notification component 122, a presentation component 124, a registry component 126, a token component 128, and/or other instruction components. Processor(s) 132a and processor(s) 132b may be similar to processor(s) 132 as described elsewhere in this disclosure, though included in administration servers 115 and registry servers 111, respectively, as depicted in FIG. 1. Machine-readable instructions 106a and machine-readable instructions 106b may be similar to machine-readable instructions 106 as described elsewhere in this disclosure, though included in administration servers 115 and registry servers 111, respectively, as depicted in FIG. 1.

Game component 108 is configured to execute, via online gaming platform 105, one or more instances of one or more games, including but not limited to a franchise game. An instance of a franchise game may facilitate presentation of the franchise game to players 123. For example, the instance of the franchise game may be an online game executed with online gaming platform 105. Game component 108 may be configured to implement in-game actions in the instance of the franchise game, e.g., in response to in-game action instructions for the in-game actions by the players. In some implementations, game component 108 may be arranged, organized, and/or otherwise included in online gaming platform 105. As used herein, the term "game" may refer to one or more games within online gaming platform 105. In some implementations, the (franchise) game may be provided via a virtual space, and may include a plurality of resource types and/or maps.

The presentation of the franchise game may be based on the views of the franchise game that are determined during execution of the franchise game, e.g., as based on instructions and/or other input from players. In some implementations, the view may be communicated (e.g., by streaming, via object/position data, and/or other information) from online gaming platform 105, registry server(s) 111, and/or other sources to client computing platforms 104 for presentation to players 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by player 123.

The instance of the franchise game may include a simulated space that is accessible by players 123 by clients (e.g., client computing platforms 104) that present the views of the virtual space to a player. The simulated space may have a topography, express ongoing real-time interaction by one or more players 123, and/or include one or more objects positioned within the topography that are capable of locomotion and/or movement within the topography. The topography may include virtual territories, including but not limited to benefit-producing virtual territories. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the franchise game, players 123 may control and/or otherwise manage rosters, characters, objects, simulated physical phenomena, and/or other elements within the virtual space to interact with the virtual space and/or each other. The characters may include avatars. As used herein, the term "character" or "player character" may refer to an object or group of objects present in the virtual space, that correspond(s) to an individual player. A particular player character may be controlled by the particular player with which it is associated. Such player characters may be referred to as player-controlled characters. Player-controlled element(s) may move through and interact with the virtual space (e.g., non-player characters in the virtual space, other objects in the virtual space, other player-controlled elements, etc.). In some implementations, player-controlled characters may be capable of locomotion within the topography of the simulated space that is included in the instance of the franchise game. In some implementations, the topography may include one or more restricted areas that are only accessible under certain conditions. In some implementations, player-controlled elements controlled by and/or associated with a given player may be created and/or customized by the given player. Individual players 123 and/or player accounts may own or control an inventory of virtual goods and currencies (e.g., resources of a plurality of resource types) that the individual player can use (e.g., by manipulation of a player character and/or other player-controlled elements) and/or other items, to perform in-game actions within the virtual space. By way of non-limiting illustration, players 123 may include the first player, the second player, and/or other players that interact with online gaming platform 105. For example, the first player and the second player may control and/or otherwise manage different (unique) digital articles in a game hosted by online gaming platform 105. In some implementations, account inventories may be managed (at least in part) using blockchain 117*a*. For example, ownership rights (and/or other types of rights) of individual virtual items included in an individual account inventory may be recorded on blockchain 117*a*. In some implementations, at least some individual virtual items (also referred to as correlated entities or correlated in-game characters) may correlate to individual unique digital articles (ownership of which may be tracked by registry servers 111). In some implementations, individual account inventories may correspond to individual smart contracts stored on blockchain 117*a*.

Players may be classified as belonging to, being part of, or having one or more player types. For example, in some cases, the different player types include a first player type and a second player type. In other cases, the different player types include a first player type, a second player type, and a third player type. In some implementations, the different player types may be mutually exclusive, so an individual player can only have one player type at a given moment. Individual player types may correspond to and/or otherwise provide access to different sets of utilities within online gaming platform 105. For example, the first player type may provide access to a first set of utilities, the second player type may provide access to a second set of utilities, and so forth. In some cases, the different player types are hierarchical, such that a player of the second player type has access to all utilities that correspond to the first player type (i.e., the first set of utilities), as well as an additional set of utilities (e.g., the second set of utilities) that players of the first player type do not have access to. Individual players may upgrade their player type (e.g., from the first player type to the second player type), as described elsewhere in this disclosure. In some implementations, individual players of the first player type may have access to the first set of utilities without requiring staking or other consideration from the individual players. In other words, the first player type may be free to play.

Interaction component 110 may be configured to enable, facilitate, implement, and/or otherwise perform (in-game) actions by players 123 in instances of games. In some implementations, interaction component 110 may be configured to operate in response to instructions by players 123. Interaction component 110 may be configured to receive instructions from players 123, e.g., in-game action instructions, to perform in-game actions in the instance of the franchise game. For example, interaction component 110 may receive a first in-game action instruction from the first player to perform a first in-game action using a first roster of a first set of character-specific unique digital articles that are correlated with correlated in-game characters (e.g., in exchange for a particular amount of a particular currency, such as the token currency). The first in-game action may fall within the first set of utilities. For example, interaction component 110 may receive a second in-game action instruction from the second player to perform a second in-game action using a second roster of a second set of character-specific unique digital articles that are correlated with correlated in-game characters. The second in-game action may fall within the second set (or additional set) of utilities, and so forth. In some implementations, interaction component 110 may be configured to perform in-game actions, e.g., as requested.

In some implementations, interaction component 110 may receive exchange instructions, upgrade instructions, and/or other instructions. For example, interaction component 110 may receive an exchange instruction from the first player to obtain (e.g., purchase) a particular affiliation-specific unique digital article (in particular, a unique digital article specific to the first affiliation the first player is associated with). In some implementations, an exchange instruction may be performed in exchange for a particular amount of consideration. For example, in some implementations, interaction component 110 may receive an upgrade instruction to upgrade a particular player from the first player type to the second player type (e.g., in exchange for staking a particular amount of a particular digital article, either for at least a particular duration, or indefinitely). By way of non-limiting example, in-game actions may include one or more of performing a move, a dance, a movement, and/or another action within the franchise game, initiating a competition or battle within the franchise game, accessing a level or area within the franchise game, using a particular item, weapon, or another resource within the franchise game, participating in a particular game mode (e.g., a Battle Royale mode), joining a particular mission or team, engaging in a particular type of exchange and/or challenge between players, and/or other in-game actions. For example, one or more players may interact within online gaming platform 105 to build, create, gather, find, combine, and/or otherwise generate content (i.e., player-generated content). In some implementations, a player having the appropriate player type (e.g., premium) may request access to a particular type or section of a store and/or marketplace within online gaming platform 105.

In some implementations, operations may be accomplished by interaction component 110 through user interfaces 125. In particular, operations pertaining to a particular player may be accomplished or controlled or initiated through a particular user interface 125 of a particular client computing platform 104, where the particular client computing platform 104 is associated with the particular player. In other words, the particular player may interact with an instance of a franchise game through interaction component 110 and/or the particular user interface 125. In some implementations, operations by interaction component 110 may be limited, restricted, and/or otherwise controlled by other components of system 100. In some implementations, interaction component 110 may require acceptance from particular players. For example, an acceptance may be required to accept a particular offer to partake in an activity or agreement or competition. In some implementations, interaction component 110 may be configured to receive indications of acceptances and/or other agreements from players.

In some implementations, interaction component 110 may be configured to facilitate interaction of players 123 with system 100. In some implementations, interaction component 110 may be configured to facilitate interaction by players 123 through user interfaces 125. For example, a particular player may be associated with a particular client computing platform 104, which may include a particular user interface 125. In other words, an individual player interface 125 may be player-specific and/or specific to a particular client computing platform 104. In some implementations, interaction component 110 may facilitate entry and/or selection through (presentation of) one or more user interfaces 125 (such as, by way of non-limiting example, any of the interfaces described in this disclosure).

Account component 112 is configured to control, manage, and/or otherwise administer player accounts. Player accounts may be associated with players 123. Player accounts may include and/or be associated with account inventories of virtual items. For example, the player accounts may include a first player account associated with a first player, a second player account associated with a second player, and so forth. For example, the first player account may include a first account inventory of one or more virtual items (and/or currencies), the second player account may include a second account inventory of one or more virtual items (and/or currencies), and so forth. Individual players may control one or more virtual items in their individual account inventories. In some implementations, the first account inventory includes one or more unique digital articles (e.g., a first unique digital article, other unique digital articles, etc.). For example, the first account inventory may include a roster that includes a set of character-specific unique digital articles that are correlated with correlated in-game characters. In some implementations, the second account inventory includes one or more unique digital articles (e.g., a second unique digital article, other unique digital articles, etc.). The first unique digital article may be correlated with a first in-game player-controllable character configured to be used (e.g., played with) in the instance of the franchise game. The second unique digital article may be correlated with a second in-game player-controllable character configured to be used (e.g., played with) in the instance of the franchise game, and so forth. Account component 112 may be configured to modify player accounts. For example, account component 112 may modify a particular player account in accordance with a received instruction, such as, e.g., an exchange instruction. In some implementations, a particular player account may be associated with a set of multiple players. For example, a group of players may share a group player account.

Performance component 114 may be configured to perform in-game actions. For example, performance component 114 may perform in-game actions as requested and/or instructed by players (e.g., based on a request received by interaction component 110).

In some implementations, exchange component 116 may receive exchange instructions, and/or other instructions. For example, exchange component may receive an exchange instruction from a particular player to obtain a particular affiliation-specific unique digital article in exchange for a particular amount of consideration. In some cases, the particular affiliation-specific unique digital article may be specific to the particular affiliation the particular player is associated with, or wishes to be associated with.

Linking component 118 may provide links and/or connections between the franchise game and/or online gaming platform 105 and real-world events (e.g., real-world scores, outcomes, statistics, news, etc.), real-world people (e.g., athletes), real-world teams (e.g., sports teams), and/or other real-world information. In some implementations, linking component 118 may directly provide real-world information to the franchise game. In some implementations, linking component 118 may obtain real-world information from a real-world source of information (such as, e.g., a news source or oracle, which may be part of external resources 138). For example, the competitive results for a particular real-world professional sports team may affect the franchise game (by way of non-limiting example, the gameplay for an affiliation that corresponds to the particular real-world professional sports team, or the gameplay for an in-game character that represents a real-world athlete on the particular real-world professional sports team).

Recording component 120 is configured to record information, assets, transactions, and/or digital articles on permanent registries. In some implementations, the information may include executable code, such as, e.g., smart contracts. In some implementations, the recordation may cause execution of the executable code. In some implementations, recording component 120 may record and/or modify rights pertaining to digital articles. In some implementations, recording component 120 may be configured to receive (recordation) instructions to perform a recordation (e.g., of a unique digital article or a smart contract on a permanent registry). For example, recording component 120 may receive, from a first player, a recordation instruction to record ownership of a first affiliation-specific unique digital article on a first permanent registry (such as, e.g., blockchain 117a). In some implementations, recording component 120 may receive such instructions from online gaming platform 105 and/or other components of system 100. For example, a particular instruction to record (rights pertaining to) a particular unique digital article may correspond to the issuance and/or creation of that particular unique digital article. For example, a particular instruction to record ownership of a particular unique digital article may correspond to the transfer of that particular unique digital article between players. When a unique digital article or other digital article is issued and/or created, recording component 120 may record its ownership on a particular permanent registry. In some implementations, a particular instruction to modify rights pertaining to a particular unique digital article may correspond to an exchange of that particular unique digital article (e.g., between two players).

In some implementations, recording component 120 may be configured to record executable code on a particular permanent registry, such as, e.g., blockchain 117a. In some implementations, particular executable code may be a particular smart contract. The particular smart contract may interact with other components of system 100, including but not limited to online gaming platform 105. A particular smart contract may be configured to perform one or more evaluations based on (received) information. In some implementations, the one or more evaluations may evaluate whether to provide distributions to one or more players. In some implementations, access to distributions may be implemented as a smart contract, and owned by one or more players.

Notification component 122 may be configured to notify players. For example, notification component 122 may notify players 123 in response to events, distributions, in-game action instructions, and/or other activities in system 100. In some implementations, a player may be notified responsive to a change of the player type of the player. In some implementations, a player may be notified responsive to an in-game action (as instructed through an in-game action instruction) not being permitted or not being performed. In some implementations, actions by notification component 122 may be performed responsive to particular actions, results, determinations, and/or decisions from other components of system 100. For example, notification component 122 may respond to a particular in-game action instruction (by a particular player, and pertaining to a particular unique digital article) with a particular response such that, responsive to a particular determination, the particular response notifies the particular player accordingly.

Presentation component 124 may be configured to present interfaces (e.g., user interfaces 125) to players, e.g., through client computing platforms 104 associated with the respective players. In some implementations, presentation component 124 may be configured to effectuate presentations of interfaces to players 123. In some implementations, presentations by presentation component 124 may be performed jointly (or at least in some cooperative manner) with one or both of game component 108 and/or interaction component 110. In some implementations, presentation component 124 may present offers (e.g., for exchanges with other players) to particular players.

Registry component 126 may be configured to generate sets of instructions for registry servers 111 (e.g., registry server 111a) and/or one or more permanent registries (e.g., blockchain 117a). In some implementations, registry component 126 may be configured to transfer the generated sets of instructions to registry servers 111 and/or one or more permanent registries. In some implementations, one or more of these instructions may instruct the formation of a smart contract and/or the recording of the smart contract on the one or more permanent registries (e.g., blockchain 117a). In some implementations, one or more of these instructions may call and/or otherwise invoke a method or function of a smart contract on the one or more permanent registries (e.g., blockchain 117a). In some implementations, these instructions may instruct registry servers 111 to record and/or modify unique digital articles, transactions, and/or rights on one or more permanent registries, or to analyze ownership as recorded on the one or more permanent registries. In some implementations, these instructions may instruct registry servers 111 to record and/or modify sets of usage information (e.g., ownership rights) pertaining to unique digital articles. For example, registry component 126 may transfer a particular set of instructions that, upon execution by blockchain 117a, issues a new unique digital article to a particular player or particular account (i.e., record the rights and/or other usage information pertaining to the new unique digital article, including it being owned by the particular player or the particular account). Individual unique digital articles may be associated with individual sets of usage information, including but not limited to ownership rights. For example, registry component 126 may transfer a particular set of instructions that, upon execution by blockchain 117a and blockchain 117b, remove a particular unique digital article from blockchain 117a and add the particular unique digital article to blockchain 117b. For example, registry component 126 may transfer a particular set of instructions that, upon execution by blockchain 117a and blockchain 117b, analyze whether a particular player owns one or more particular unique digital articles.

Token component 128 may be configured to facilitate usage of one or more digital articles or currencies (e.g., a first digital article—which may be fungible—or a second digital article—which may be unique, non-fungible, etc.) within online gaming platform 105. In some implementations, token component 128 may manage, facilitate, and/or otherwise control the use of one or more types of different digital articles and/or currencies. A particular digital article may be exchangeable and/or otherwise usable by individual players to upgrade from a first player type to a second player type. For example, a player may upgrade his player type in exchange for (staking) a particular amount of a particular digital article. A first currency may be exchangeable by players of the first player type for at least some of the first set of utilities. For example, a first amount of the first currency may be exchanged for a particular in-game item, a second amount of the first currency may be exchanged for a particular in-game service, a third amount of the first currency may be exchanged for access to particular in-game content (that was previously restricted and not accessible to this particular player of the first player type). The first currency may have many different uses. In some implementations, token component 128 may control supply and/or demand of a particular digital article. For example, in cases where the digital article is a fungible digital article that is tradeable on a permanent registry (e.g., blockchain 117a), token component 128 may issue, mint, destroy, burn, and/or otherwise modify the amount of this digital article in circulation. In some implementations, token component 128 may set and/or otherwise modify one or more exchange rates between different digital articles and/or currencies. In some implementations, token component 128 may set and/or otherwise modify prices for purchasing particular amounts of the particular digital article. In some implementations, the particular digital article may be based on the ERC-20 standard (or an equivalent standard for non-Ethereum-based blockchains). In some implementations, the particular digital article may be based on a standard that is a superset of the ERC-20 standard (e.g., ERC-223 or another superset of an equivalent standard for non-Ethereum-based blockchains) that provides at least the same functions and/or methods as that standard. In some implementations, a particular currency may be implemented by the particular digital article. In some implementations, the particular digital article may operate as a currency within online gaming platform 105.

Receipt component 136 may be configured to receive (sets of) instructions to add, modify, analyze, and/or remove recorded information (e.g., rights) in blockchain 117a. For example, receipt component 136 may receive one or more sets of instructions from registry component 126, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117a and other components of system 100. For example, in some implementations, API 107 may support methods or functions that are implemented as function calls to smart contracts stored on blockchain 117a. For example, in some implementations, API 107 may support methods or functions that analyze whether a particular player owns one or more particular unique digital articles, one or more particular types of unique digital articles, and/or a particular collection of multiple unique digital articles. In some implementations, receipt component 136 may be arranged, organized, and/or otherwise included in registry server 111 and/or blockchain 117a.

Transaction component 134 may be configured to record information, including but not limited to (ownership) rights pertaining to digital articles, e.g., on one or more permanent registries, such as blockchain 117a. In some implementations, transaction component 134 may record information on electronic storage 130b. In some implementations, transaction component 134 may record information on blockchain 117a. The information may include ownership rights, distribution rights, other rights, and/or other information. For example, particular recorded information may reflect rights pertaining to a particular digital article by a particular player. For example, a particular unique digital article may represent a three-dimensional in-game player-controllable item or character that can interact with other virtual items within online gaming platform 105. Recorded information may be specific to a digital article (i.e., article-specific). For example, distribution rights for a particular digital article may designate rights to certain distributions of benefits upon a specifically defined in-game action (e.g., an exchange between players) involving the particular digital article.

In some implementations, transaction component 134 may be configured to record information in blockchain 117a. In some implementations, transaction component 134 may add, modify, analyze, and/or remove recorded information. For example, in accordance with received instructions from receipt component 136, transaction component 134 may transfer rights pertaining to a particular digital article from a first owner to a second owner (e.g., from an original owner to a new owner, or from a loser of a challenge to a winner of the challenge) such that the recorded information on blockchain 117a no longer reflect the rights pertaining to the particular digital article by the first player. In some implementations, in accordance with received instructions, transaction component 134 may transfer rights pertaining to a particular digital article temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, transaction component 134 may transfer rights pertaining to a particular digital article non-temporarily from a first owner to a second owner, e.g., when a particular exchange is not reversible or no longer reversible. In some implementations, transaction component 134 may be arranged, organized, and/or otherwise included in blockchain 117a. In some implementations, transaction component 134 may be configured to obtain article-specific information (e.g., ownership rights, distribution rights, and/or other information) for particular digital articles. In some implementations, transaction component 134 may be configured to access blockchain 117a to obtain the article-specific information (that is recorded on blockchain 117a, e.g., in one or more smart contracts).

Input component 135 may be configured to receive user input from administrative users. For example, the user input may include entry and/or selection of particular information regarding any entity or object that interacts with any part of system 100 and/or plays a part in the operation of system 100. For example, the user input may include entry and/or selection of a particular instruction to modify the exchange rate between a first currency and a second currency. For example, the user input may include entry and/or selection of a particular instruction to modify the price for particular affiliation-specific unique digital articles. For example, the user input may include entry and/or selection of a particular instruction to release and/or otherwise offer for sale particular character-specific unique digital articles.

Communication component 137 may be configured to facilitate communication and/or interaction between administration server 115 and the rest of system 100. For example, communication component 137 may communicate user input received from administrative users by input component 135 to other components of system 100, particularly online gaming platform 105.

Figure 3:
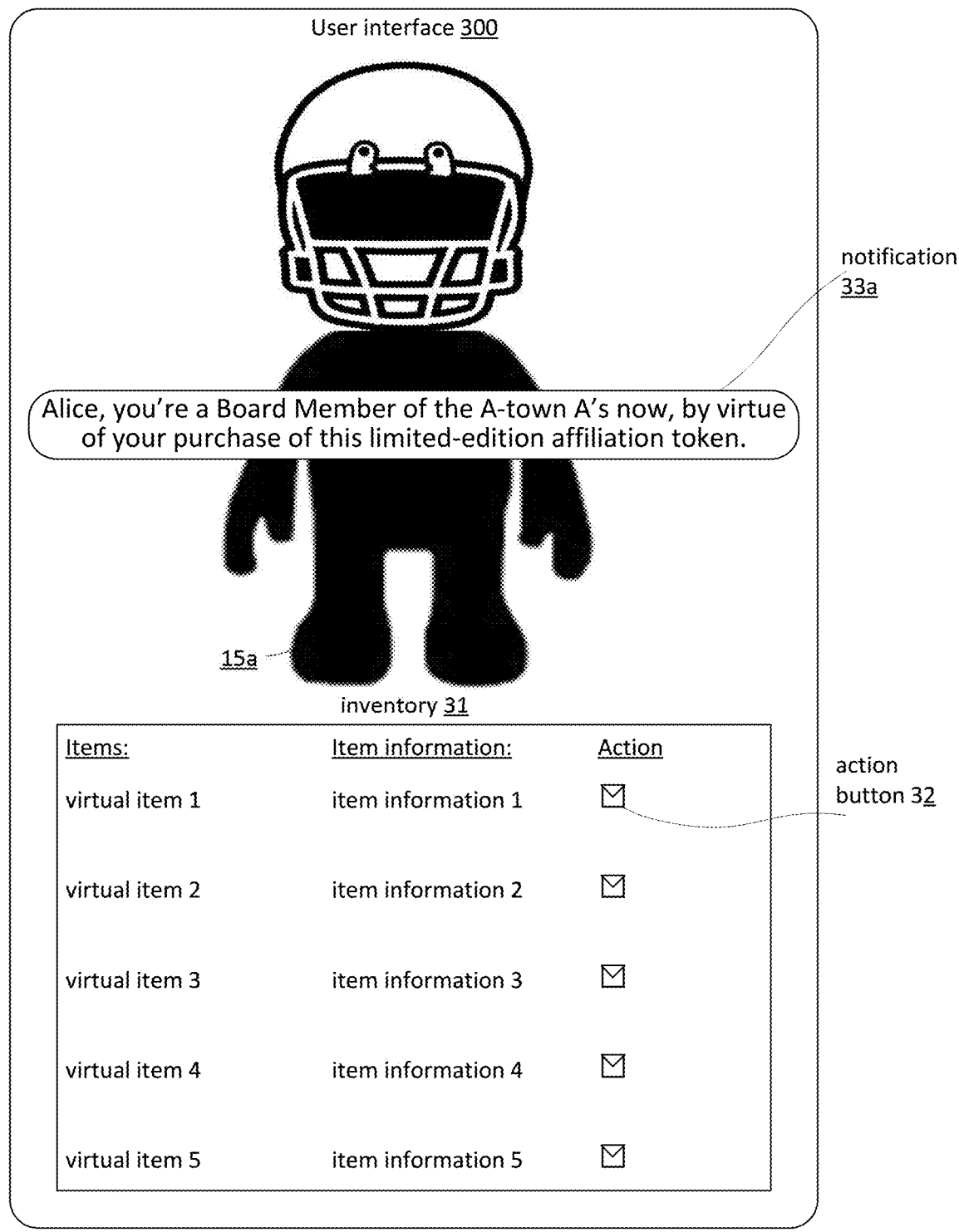
FIG. 3 illustrates an example implementation of a player interface, as may be used by a system configured to support different player types in a franchise game based on ownership of unique digital articles, in accordance with one or more implementations.

FIG. 3 illustrates an example implementation of a user interface 300 as may be used by system 100, in accordance with one or more implementations. User interface 300 may enable a particular player (say, "Alice", not depicted) to view and/or use an account inventory controlled by the particular player. User interface 300 may include a section or field for account inventory 31, and/or other graphical player interface elements. As depicted, account inventory 31 may include a list of different virtual items and/or articles currently controlled by Alice, including virtual items 1-2-3-4-5. Account inventory 31 further depicts item information regarding these virtual items, as indicated by item information 1-2-3-4-5, which correspond to virtual items 1-2-3-4-5, respectively. Account inventory 31 as depicted may further include graphical user interface elements such as, by way of non-limiting example, an action button 32 (which initiates an in-game action instruction). Upon engagement by Alice, in-game action instruction button 32 may instruct "virtual item 1" to be used for a particular purpose (e.g., through a text field or a dropdown menu, as indicated by a triangle in a box). For example, Alice may instruct in-game information to be displayed about unique digital article 15a, and unique digital article 15a may be specific to a particular affiliation in the franchise game. User interface 300 as depicted may further include graphical user interface elements such as, by way of non-limiting example, a notification element 33a. Alice may be part of a group of players who own affiliation-specific unique digital articles of the same affiliation. Assuming Alice just purchased unique digital article 15a, Alice currently has the second player type, as indicated by notification 33a, labeled "Alice, you're A Board Member of the A-town A's, by virtue of your purchase of this limited-edition affiliation token." In some implementations, new or additional utilities may become available to Alice due to having the second player type. In some implementations, new or additional benefits (such as, e.g., benefits shared among players of the same affiliation and also the second player type) may become available to Alice due to having the second player type. Note that if Alice lost or sold unique digital article 15a, she would no longer be a Board Member (i.e., have the second player type).

Figure 4:
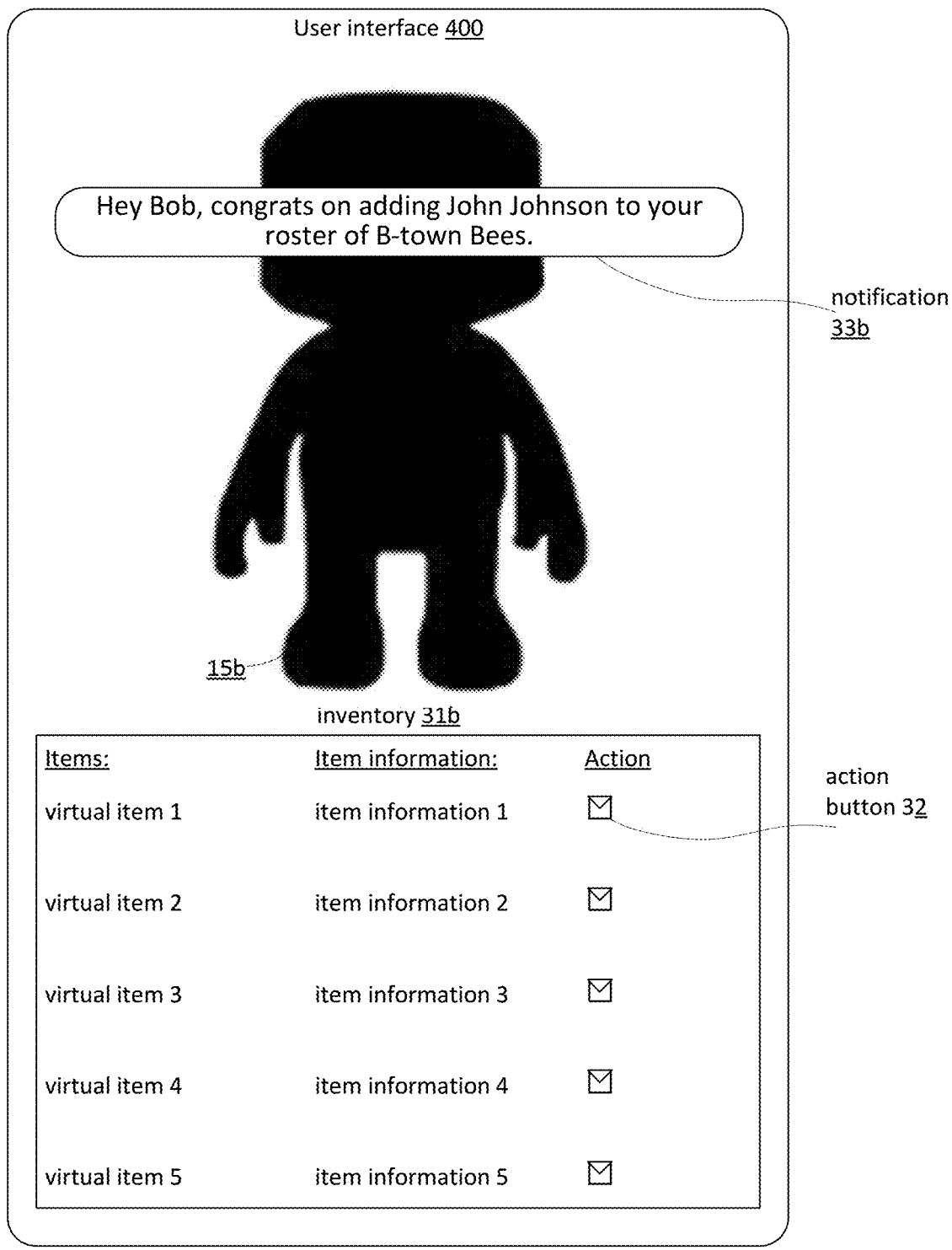
FIG. 4 illustrate an example implementation of a player interface, as may be used by a system configured to support different player types in a franchise game based on ownership of unique digital articles, in accordance with one or more implementations.

FIG. 4 illustrates an example implementation of a user interface 400 as may be used by system 100, in accordance with one or more implementations. User interface 400 may enable a particular player (say, "Bob", not depicted) to view and/or use an account inventory and/or one or more unique digital articles controlled by the particular player. User interface 400 may include a section or field for account inventory 31b, and/or other graphical user interface elements. As depicted, account inventory 31b may include a list of different virtual items and/or articles currently controlled by Bob, including virtual items 1-2-3-4-5. Account inventory 31b further depicts item information regarding these virtual items, as indicated by item information 1-2-3-4-5, which correspond to virtual items 1-2-3-4-5, respectively. Account inventory 31b as depicted may further include graphical user interface elements such as, by way of non-limiting example, an action button 32 (which initiates an in-game action instruction). Upon engagement by Bob, in-game action instruction button 32 may request "virtual item 1" to be used for a particular purpose (e.g., through a text field or a dropdown menu, as indicated by a triangle in a box). For example, Bob may instruct in-game information to be displayed about unique digital article 15b, and unique digital article 15b may be a character-specific unique digital article correlated with a player-controllable in-game character. User interface 400 as depicted may further include graphical user interface elements such as, by way of non-limiting example, a notification element 33b. Bob may have just purchased unique digital article 15b. Bob may be notified, as indicated by notification 33b, labeled "Hey Bob, congrats on adding John Johnson to your roster of B-town Bees."

Figure 5A:
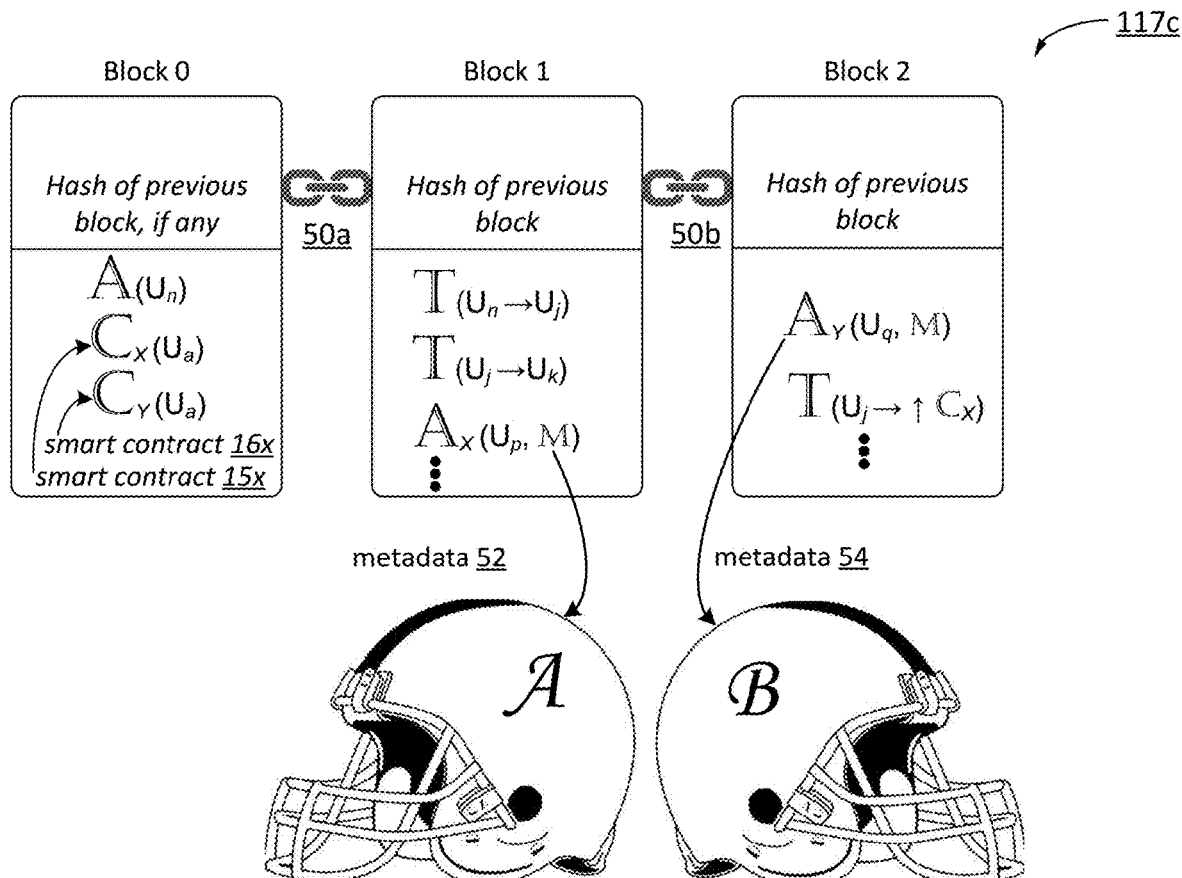
FIGS. 5A-5B illustrate exemplary permanent registries, as may be used by a system configured to support different player types in a franchise game based on ownership of unique digital articles, in accordance with one or more implementations.

FIG. 5A illustrate exemplary blockchain 117c as may be used by system 100, in accordance with one or more implementations. FIG. 5A illustrates a blockchain 117c that includes a block 0, a block 1, and a block 2. As time progresses, more blocks may be added to blockchain 117c. The blocks within blockchain 117c are ordered. In block 0, one article (indicated by a capital "A") is generated and/or assigned to player "n" ($U_n$). A second digital article, a smart contract 15x is assigned to player "a" ($U_a$), and a third digital article, a smart contract 16x, is assigned to player "a" ($U_a$), which may be an administrative user. For example, smart contract 15x and smart contract 16x may represent control over different affiliation-specific sets of unique digital articles. Smart contract 15x and smart contract 16x may have been posted to blockchain 117c by a component similar to record component 134. In some implementations, smart contract 15x and smart contract 16x may include or link to executable code for issuing particular digital articles in blockchain 117c (e.g., this code is invoked in block 1 and block 2).

For example, the articles in block 0 may include individual ownership rights recorded for particular digital articles within an online gaming platform, similar to or the same as online game platform 105. Block 1 is connected to block 0 (as indicated by a link 50a), for example by including an address of block 1 in block 0, or vice versa. Likewise, block 1 is connected to block 2, as indicated by a link 50b. In block 1, a transaction to smart contract 15x (indicated by "Ax") is recorded. Transaction Ax to smart contract 15x may assign a first unique digital article to a first player labeled "p", with the unique digital article being defined by metadata 52. Here, metadata 52 may define the current owner—the first player—as well as particulars regarding the first unique digital article (here, associated with a particular affiliation, the "A-Town A's"). In block 1, another transactions from player "n" to player "j", and from player "j" to player "k" are also recorded. In block 2, several transactions may be recorded: a transaction from player "j" to smart contract 15x, and a transaction to smart contract 16x (indicated by "$A_Y$") is recorded. Transaction $A_Y$ to smart contract 16x may assign a second unique digital article to a second player labeled "q", with the unique digital article being defined by metadata 54. Here, metadata 54 may define the current owner, as well as particulars regarding the second unique digital article (here, associated with a different affiliation, the "B-Town Bees").

Figure 5B:
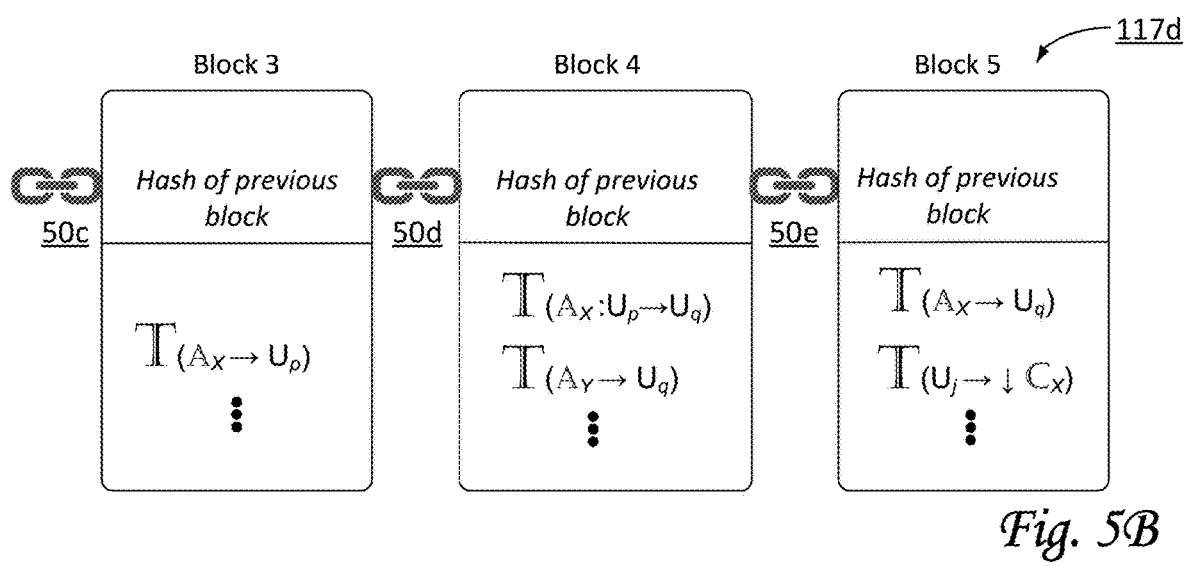

By way of non-limiting example, FIG. 5B illustrates a blockchain 117d that includes several blocks (block 3, block 4, block 5), that have been appended to blockchain 117c. Block 3 may be connected to block 2 (as indicated by link 50c), block 4 may be connected to block 3 (as indicated by a link 50d), and block 5 may be connected to block 4 (as indicated by a link 50e). In block 3, a transaction may be recorded regarding a distribution of in-game benefits or assets, earned by virtue of the ownership of the unique digital article indicated by "Ax" and defined by metadata 52, to player "p". Receiving these benefits may be restricted to players of the second player type (e.g., the distribution may be provided to players who own affiliation-specific unique digital articles that are specific to the "A-Town A's"). Block 4 includes a transaction (indicated by a capital "T") of unique digital article "Ax" to player "q". Additionally, block 4 includes a transaction regarding a distribution of in-game benefits or assets to player "q". Block 5 includes a transaction regarding a distribution of in-game benefits or assets to players who currently own affiliation-specific unique digital articles that are specific to the "A-Town A's", which includes player "q", but which no longer includes player "p". Block 5 further includes a transaction from player "j" to smart contract 15x.

Referring to FIG. 1, user interfaces 125 may be configured to facilitate interaction between players 123 and system 100 and/or between players 123 and client computing platforms 104. For example, user interfaces 125 may provide an interface through which players 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other player interface devices configured to receive and/or convey player input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between players.

Referring to FIG. 1, in some implementations, online gaming platforms 105, server(s) 102, client computing platform(s) 104, administration servers 115, registry servers 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, registry servers 111, and/or external resources 138 may be operatively linked via some other communication media.

A given client computing platform 104 may include one or more processors configured to execute computer program components. The computer program components may be configured to enable an expert or player associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Administration server(s) 115 may include one or more of servers 102a, processors 132a, machine-readable instructions 106a, electronic storage 130a, and/or other components. Server(s) 102a may be configured by machine-readable instructions 106a. Machine-readable instructions 106a may include one or more instruction components. The instruction components may include one or more of input component 135, communication component 137, and/or other instruction components. Administration server 115 may include communication lines, or ports to enable the exchange of information with a network and/or other computing platforms. In some implementations, administration servers 115 may be used by one or more administrative users, e.g., to configure and/or control operation of system 100. In some implementations, administrative servers 115 may include or present one or more player interfaces to receive player input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, one or more external resources 138 may provide real-world information (e.g., event information regarding events that are occurring and/or have occurred in the real world) to components of system 100. In some implementations, external resources 138 may include one or more real-world information servers or blockchain oracles (not independently depicted in FIG. 1).

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination.

Processor(s) 132 may be configured to execute components 108, 110, 112, 114, 116, 118, 120, 122, 124, 126, 128, 134, 135, 136, and/or 137, and/or other components. Processor(s) 132 may be configured to execute components 108, 110, 112, 114, 116, 118, 120, 122, 124, 126, 128, 134, 135, 136, and/or 137, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 134, 135, 136, and/or 137 are illustrated in FIG. 1 as being implemented within a single processing unit, in implementations in which processor(s) 132 includes multiple processing units, one or more of components 108, 110, 112, 114, 116, 118, 120, 122, 124, 126, 128, 134, 135, 136, and/or 137 may be implemented remotely from the other components. The description of the functionality provided by the different components 108, 110, 112, 114, 116, 118, 120, 122, 124, 126, 128, 134, 135, 136, and/or 137 described below is for illustrative purposes only, and is not intended to be limiting, as any of components 108, 110, 112, 114, 116, 118, 120, 122, 124, 126, 128, 134, 135, 136, and/or 137 may provide more or less functionality than is described. For example, one or more of components 108, 110, 112, 114, 116, 118, 120, 122, 124, 126, 128, 134, 135, 136, and/or 137 may be eliminated, and some or all of its functionality may be provided by other ones of components 108, 110, 112, 114, 116, 118, 120, 122, 124, 126, 128, 134, 135, 136, and/or 137. As another example, processor(s) 132 may be configured to execute one or more additional components that may perform some or all of the functionality attributed below to one of components 108, 110, 112, 114, 116, 118, 120, 122, 124, 126, 128, 134, 135, 136, and/or 137.

Figure 2:
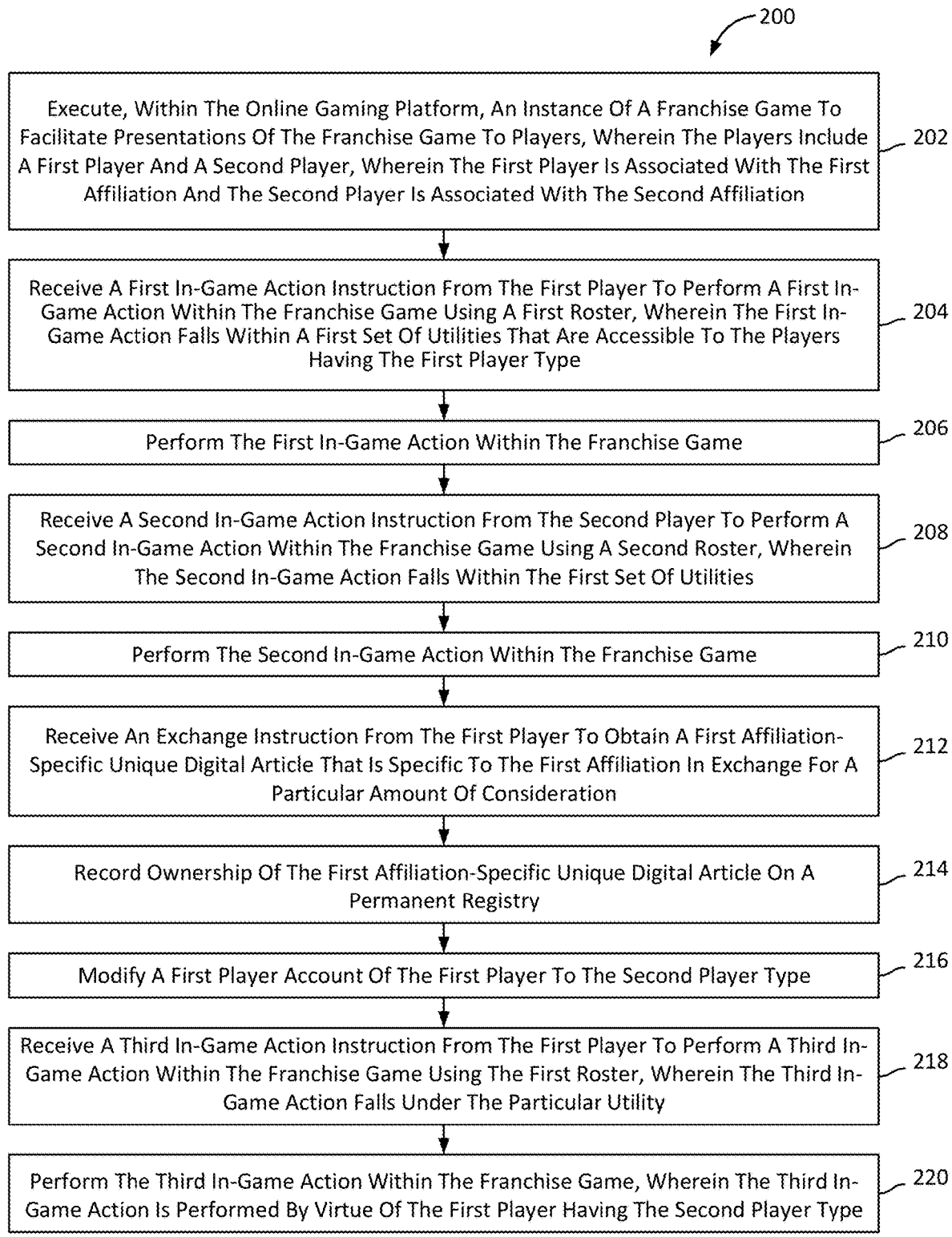
FIG. 2 illustrates a method of supporting different player types in a franchise game based on ownership of unique digital articles, in accordance with one or more implementations.

FIG. 2 illustrates a method 200 of supporting different player types in a franchise game based on ownership of unique digital articles, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of the franchise game is executed, within an online gaming platform, to facilitate presentations of the franchise game to players. The players include a first player and a second player. The first player is associated with the first affiliation and the second player is associated with the second affiliation. The first player manages a first roster including a first set of character-specific unique digital articles that are correlated with correlated in-game characters. The second player manages a second roster including a second set of character-specific unique digital articles that are correlated with correlated in-game characters. In some embodiments, operation 202 is performed by a game component the same as or similar to game component 108 (shown in FIG. 1 and described herein).

At an operation 204, a first in-game action instruction is received from the first player to perform a first in-game action within the franchise game using the first roster. The first in-game action falls within the first set of utilities that are accessible to the players having the first player type. In some embodiments, operation 204 is performed by an interaction component the same as or similar to interaction component 110 (shown in FIG. 1 and described herein).

At an operation 206, the first in-game action is performed within the franchise game. In some embodiments, operation 206 is performed by a performance component and/or interaction component the same as or similar to performance component 114 and/or interaction component 110 (shown in FIG. 1 and described herein).

At an operation 208, a second in-game action instruction is received from the second player to perform a second in-game action within the franchise game using the second roster. The second in-game action falls within the first set of utilities. In some embodiments, operation 208 is performed by an interaction component the same as or similar to interaction component 110 (shown in FIG. 1 and described herein).

At an operation 210, the second in-game action is performed within the franchise game. In some embodiments, operation 210 is performed by a performance component and/or interaction component the same as or similar to performance component 114 and/or interaction component 110 (shown in FIG. 1 and described herein).

At an operation 212, an exchange instruction is received from the first player to obtain a first affiliation-specific unique digital article that is specific to the first affiliation in exchange for a particular amount of consideration. In some embodiments, operation 212 is performed by an exchange component the same as or similar to exchange component 116 (shown in FIG. 1 and described herein).

At an operation 214, ownership of the first affiliation-specific unique digital article is recorded on a permanent registry. The permanent registry is based on blockchain technology implementing an append-only blockchain. In some embodiments, operation 214 is performed by a recording component and/or a registry component the same as or similar to recording component 120 and/or registry component 126 (shown in FIG. 1 and described herein).

At an operation 216, a first player account of the first player is modified such that the first player has the second player type, in accordance with the exchange instruction. In some embodiments, operation 216 is performed by an account component the same as or similar to account component 112 (shown in FIG. 1 and described herein).

At an operation 218, a third in-game action instruction is received from the first player to perform a third in-game action within the franchise game using the first roster. The third in-game action falls under the particular utility. In some embodiments, operation 218 is performed by an interaction component the same as or similar to interaction component 110 (shown in FIG. 1 and described herein).

At an operation 220, the third in-game action is performed within the franchise game. The third in-game action is performed by virtue of the first player having the second player type. In some embodiments, operation 220 is performed by a performance component and/or interaction component the same as or similar to performance component 114 and/or interaction component 110 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to support different player types in a franchise game based on ownership of unique digital articles, wherein the franchise game includes a set of affiliations that include a first affiliation and a second affiliation, wherein the different player types include a first player type and a second player type, wherein the first player type provides access to a first set of utilities within the franchise game, wherein the second player type provides access to a second set of utilities within the franchise game, wherein the second set of utilities include a particular utility that is not included in the first set of utilities, wherein the second player type is based on ownership of an affiliation-specific unique digital article, the system comprising:

an online gaming platform including one or more hardware processors configured by machine-readable instructions to:

execute, within the online gaming platform, an instance of the franchise game to facilitate presentations of the franchise game to players, wherein the players include a first player and a second player, wherein the first player is associated with the first affiliation and the second player is associated with the second affiliation, wherein the first player manages a first roster including a first set of character-specific unique digital articles that are correlated with correlated in-game characters, wherein the second player manages a second roster including a second set of character-specific unique digital articles that are correlated with correlated in-game characters;

receive a first in-game action instruction from the first player to perform a first in-game action within the franchise game using the first roster, wherein the first in-game action falls within the first set of utilities that are accessible to the players having the first player type;

perform the first in-game action within the franchise game;

receive a second in-game action instruction from the second player to perform a second in-game action within the franchise game using the second roster, wherein the second in-game action falls within the first set of utilities;

perform the second in-game action within the franchise game;

receive an exchange instruction from the first player to obtain a first affiliation-specific unique digital article that is specific to the first affiliation in exchange for a particular amount of consideration;

record ownership of the first affiliation-specific unique digital article on a permanent registry, wherein the permanent registry is based on blockchain technology implementing an append-only blockchain;

modify a first player account of the first player such that the first player has the second player type, in accordance with the exchange instruction; and receive a third in-game action instruction from the first player to perform a third in-game action within the franchise game using the first roster, wherein the third in-game action falls under the particular utility; and perform the third in-game action within the franchise game, wherein the third in-game action is performed by virtue of the first player having the second player type.

2. The system of claim 1, wherein individual ones of the set of affiliations correspond to individual professional sports-teams in the real world.

3. The system of claim 1, wherein the affiliation-specific unique digital articles are limited to a predetermined number of unique digital articles per affiliation.

4. The system of claim 1, wherein the ownership of the first affiliation-specific unique digital article by the first player is recorded on the permanent registry using a transaction that includes the first player as the beneficiary.

5. The system of claim 4, wherein the first affiliation-specific unique digital article is tradeable on the permanent registry.

6. The system of claim 1, wherein at least one of the first in-game action and the second in-game action include at least one of:

(i) purchase a virtual item that can be used within the franchise game,
(ii) enter a restricted area within the franchise game,
(iii) participate in a particular multi-player game mode within the franchise game,
(iv) modify the first roster and/or the second roster; and
(v) participate in a particular media channel related to the franchise game.

7. The system of claim 1, wherein individual players of the first player type have access to the first set of utilities within the online gaming platform for free.

8. The system of claim 2, wherein real-world statistics for the individual professional sports-teams in the real world affect gameplay in the franchise game.

9. The system of claim 1, wherein the players having the first player type exchange consideration for performances of at least some of the in-game actions falling within the first set of utilities.

10. The system of claim 9, wherein the players having the second player type receive a portion of the consideration.

11. A method of supporting different player types in a franchise game based on ownership of unique digital articles, wherein the franchise game includes a set of affiliations that include a first affiliation and a second affiliation, wherein the different player types include a first player type and a second player type, wherein the first player type provides access to a first set of utilities within the franchise game, wherein the second player type provides access to a second set of utilities within the franchise game, wherein the second set of utilities include a particular utility that is not included in the first set of utilities, wherein the second player type is based on ownership of an affiliation-specific unique digital article, the method comprising:

executing, within the online gaming platform, an instance of the franchise game to facilitate presentations of the franchise game to players, wherein the players include a first player and a second player, wherein the first player is associated with the first affiliation and the second player is associated with the second affiliation, wherein the first player manages a first roster including a first set of character-specific unique digital articles that are correlated with correlated in-game characters, wherein the second player manages a second roster including a second set of character-specific unique digital articles that are correlated with correlated in-game characters;

receiving a first in-game action instruction from the first player to perform a first in-game action within the franchise game using the first roster, wherein the first in-game action falls within the first set of utilities that are accessible to the players having the first player type;

performing the first in-game action within the franchise game;

receiving a second in-game action instruction from the second player to perform a second in-game action within the franchise game using the second roster, wherein the second in-game action falls within the first set of utilities;

performing the second in-game action within the franchise game;

receiving an exchange instruction from the first player to obtain a first affiliation-specific unique digital article that is specific to the first affiliation in exchange for a particular amount of consideration;

recording ownership of the first affiliation-specific unique digital article on a permanent registry, wherein the permanent registry is based on blockchain technology implementing an append-only blockchain;

modifying a first player account of the first player such that the first player has the second player type, in accordance with the exchange instruction;

receiving a third in-game action instruction from the first player to perform a third in-game action within the franchise game using the first roster, wherein the third in-game action falls under the particular utility; and performing the third in-game action within the franchise game, wherein the third in-game action is performed by virtue of the first player having the second player type.

12. The method of claim 11, wherein individual ones of the set of affiliations correspond to individual professional sports-teams in the real world.

13. The method of claim 11, wherein the affiliation-specific unique digital articles are limited to a predetermined number of unique digital articles per affiliation.

14. The method of claim 11, wherein the ownership of the first affiliation-specific unique digital article by the first player is recorded on the permanent registry using a transaction that includes the first player as the beneficiary.

15. The method of claim 14, wherein the first affiliation-specific unique digital article is tradeable on the permanent registry.

16. The method of claim 11, wherein at least one of the first in-game action and the second in-game action include at least one of:
    (i) purchase a virtual item that can be used within the franchise game,
    (ii) enter a restricted area within the franchise game,
    (iii) participate in a particular multi-player game mode within the franchise game,
    (iv) modify the first roster and/or the second roster; and
    (v) participate in a particular media channel related to the franchise game.

17. The method of claim 11, wherein individual players of the first player type have access to the first set of utilities within the online gaming platform for free.

18. The method of claim 12, wherein real-world statistics for the individual professional sports-teams in the real world affect gameplay in the franchise game.

19. The method of claim 11, wherein the players having the first player type exchange consideration for performances of at least some of the in-game actions falling within the first set of utilities.

20. The method of claim 19, wherein the players having the second player type receive a portion of the consideration.

* * * * *